US00RE37935E

(19) United States
(12) Reissued Patent
Takemura et al.

(10) Patent Number: US RE37,935 E
(45) Date of Reissued Patent: Dec. 10, 2002

(54) CADMIUM NON-SINTERED NEGATIVE ELECTRODE FOR AN ALKALINE STORAGE CELL AND ITS MANUFACTURING METHOD

(75) Inventors: Masakazu Takemura, Sumoto (JP); Hironori Honda, Naruto (JP); Masayuki Terasaka, Hyogo (JP)

(73) Assignee: Sanyo Electric Co., Ltd., Osaka (JP)

(21) Appl. No.: 09/632,077

(22) Filed: Jul. 31, 2000

Related U.S. Patent Documents

Reissue of:
(64) Patent No.: 4,983,477
Issued: Jan. 8, 1991
Appl. No.: 07/465,685
Filed: Jan. 16, 1990

(30) Foreign Application Priority Data

Jan. 17, 1989 (JP) ..... 1-8365
Feb. 19, 1989 (JP) ..... 1-24949
Jun. 19, 1989 (JP) ..... 1-156410

(51) Int. Cl.[7] ..... H01M 4/38
(52) U.S. Cl. ..... 429/222; 429/60

(58) Field of Search ..... 429/60, 209, 212, 429/217, 222, 223; 252/182.1

(56) References Cited

U.S. PATENT DOCUMENTS 3,870,562 A * 3/1975 Catherino
4,614,696 A * 9/1986 Itou et al. ..... 429/222
4,826,744 A * 5/1989 Itou et al. ..... 429/206
4,938,780 A * 7/1990 Kaiya et al. ..... 429/222 X

FOREIGN PATENT DOCUMENTS

JP 57-37986 * 8/1982

* cited by examiner

*Primary Examiner*—Stephen Kalafut
(74) *Attorney, Agent, or Firm*—Hogan & Hartson, LLP

(57) ABSTRACT

A cadmium non-sintered negative electrode for use in an alkaline storage cell comprising a main active material comprising at least one of powdered cadmium oxide and powdered cadmium hydroxide; a reserve charging substance comprising powdered metal cadmium; and an additive comprising powdered nickel hydroxide whose grain shape is substantially globe and/or whose average grain size is 1.5 to 200 $\mu$m.

19 Claims, 3 Drawing Sheets

CADMIUM NON-SINTERED NEGATIVE ELECTRODE FOR AN ALKALINE STORAGE CELL AND ITS MANUFACTURING METHOD

Matter enclosed in heavy brackets [ ] appears in the original patent but forms no part of this reissue specification; matter printed in italics indicates the additions made by reissue.

BACKGROUND OF THE INVENTION (1) Field of the Invention

This invention relates to a cadmium non-sintered negative electrode for use in an alkaline storage cell like a nickel-cadmium storage cell and its manufacturing method.

(2) Description of the Prior Art

As a cadmium negative electrode for use in an alkaline storage cell like a nickel-cadmium storage cell, a paste-type cadmium non-sintered negative electrode is widely used because it is manufactured easily and at a low cost. This type of cadmium negative electrode is produced by kneading a cadmium active material like powdered cadmium oxide or powdered cadmium hydroxide with a liquid binder to obtain a paste, coating the paste on a conductive substrate and drying it. However, this type of negative electrode has a problem that a cell employing it has a shorter cycle life than a cell employing a cadmium sintered negative electrode. This is attributed to the following two points (a) and (b):

(a) Capacity deterioration of the cadmium negative electrode.

It is known that a cadmium non-sintered negative electrode produced in the above method deteriorates its capacity in the course of charge-discharge cycles.

To solve this problem, U.S. Pat. No. 3,870,562 has proposed manufacturing a cadmium non-sintered negative electrode by mixing cadmium oxide, metal cadmium comprising globe grains having an average grain size of 3 to 12 μm, and 0.1 to 5% of nickel hydroxide. The above patent says the above manufacturing method can restrict capacity deterioration which is caused by inactivation of the cadmium active material accompanied by charge-discharge cycles.

However, a residual capacity ratio of a cell which has been left for a while, namely storage characteristic and cycle characteristic of a cell vary depending on the grain shape and grain size of added nickel hydroxide.

(b) Leak of electrolyte caused by pressure valve operation

The paste including the above active material is soft. Therefore, when the negative electrode plate coated with the paste is wound together with a positive electrode and a separator by a pressure roller or the like to make an electrode assembly, the outermost end of the negative electrode of the assembly is given more pressure than its innermost end, whereby the porosity of the negative electrode plate is reduced. If the negative electrode plate has not been subjected to electrochemical formation when employed in a cell, the negative electrode plate retains a smaller amount of electrolyte, compared with if the same negative electrolyte plate has been subjected to electrochemical formation when employed in a cell. Therefore, in the former case, undischarged cadmium is accumulated in the cadmium negative electrode in the course of charge-discharge cycles. Accordingly, the porosity of the negative electrode is increased, whereby the amount of electrolyte retained in the negative electrode is increased. As a result, the amount of electrolyte retained in the separator is reduced, and so the cycle characteristic is lowered.

To solve this problem, another method has been proposed in which the above paste is coated on a conductive substrate to obtain an electrode plate and this plate is prehydrated in an aqueous solution of alkali. According to this method of chemically prehydrating cadmium oxide, cadmium hydroxide formed of large crystals is obtained. Therefore, comparatively large holes are uniformly formed in the paste-type active material and also the mechanical strength of the negative electrode plate is increased. Accordingly, even if the negative electrode plate is wound around by a pressure roller to make an electrode assembly, its porosity is kept uniformly high. If sodium hydroxide is used as an aqueous solution of alkali for prehydration, the obtained cadmium hydroxide is formed of γ-type crystals, which make the cell easy to charge. This means that generation of hydrogen gas from the negative electrode plate is restricted, and so the inner pressure of the cell is prevented from increasing.

Though prehydration in an aqueous solution of sodium hydroxide takes time, it can be shortened by raising the temperature of the solution of sodium hydroxide.

However, prehydration is conducted in too a high temperature results in obtaining cadmium hydroxide formed by β-type crystals instead of γ-type ones. Since β-type crystals are large enough to make the cell hard to charge, hydrogen gas is easily generated and so the inner pressure of the cell is increased. As a result, the pressure valve is operated to leak the electrolyte and then deteriorate the cell cycle characteristic.

SUMMARY OF THE INVENTION

Accordingly, this invention has a primary object of offering a cadmium non-sintered negative electrode for increasing cell cycle characteristic and its manufacturing method.

Another object of this invention is to offer a cadmium non-sintered negative electrode for increasing cell storage characteristic and its manufacturing method.

Still another object of this invention is to offer a cadmium non-sintered negative electrode for restricting hydrogen gas generation and its manufacturing method.

Still another object of this invention is to offer a cadmium non-sintered negative electrode which can be manufactured in simple procedures and its manufacturing method.

The above objects are fulfilled by a cadmium non-sintered negative electrode for use in an alkaline storage cell, comprising a main active material comprising at least one of powered cadmium oxide and powdered cadmium hydroxide; a reserve charging substance comprising powdered metal cadmium; and an additive comprising powdered nickel hydroxide whose grain shape is substantially globe.

The above objects are also fulfilled by a method of manufacturing a cadmium non-sintered negative electrode for use in an alkaline storage cell, comprising the steps of kneading a main active material comprising at least one powdered cadmium oxide and powdered cadmium hydroxide, a reserve charging substance comprising powdered metal cadmium, an additive comprising powdered nickel hydroxide whose grain shape is substantially globe, a binder and a dispersion medium to obtain an active material paste; coating a conductive substrate with the active material paste; and drying the active material paste.

The nickel hydroxide may be added in a weight ratio (%) of 0.5 or more and 3.0 or less.

The powdered metal cadmium may be formed of fine grains.

The powdered metal cadmium may have an average grain size of 1.0 to 2.4 $\mu$m.

The powdered metal cadmium may be produced by substitute reaction of powdered metal zinc and a solution of cadmium sulfate. The above-obtained powdered metal cadmium desirably has a specific surface area of 1 to 2 $m^2/g$, or more desirably 1 to 1.5 $m^2/g$. Though metal cadmium obtained by the Atomizer method usually has a specific surface area of 0.1 $m^2/g$ or less, the specific surface area exceeding 0.1 $m^2/g$ is desirable.

The reasons will follow.

The nickel hydroxide which has conventionally been used is formed by various-shaped grains. (This type of nickel hydroxide will be referred to as various-shaped nickel hydroxide hereinafter.) Being chemically unstable, the nickel hydroxide formed of various-shaped grains throws out foreign substances such as $NO_3$—, or $SO_4^{2}$— included in its own crystals in small amounts into the active material during the cell charge-discharge in the alkaline electrolyte. As a result, the storage characteristic of the cell is deteriorated. On the other hand, the nickel hydroxide formed of globe grains (will be referred to as globe nickel hydroxide) used in the present invention are extremely chemically stable (confirmed through experiments). Therefore, it hardly throws out the above foreign substances even during charge-discharge. In consequence, an alkaline cell employing the globe nickel hydroxide restricts the decline of its storage characteristic and its cycle characteristic is excellent.

The above objects are also fulfilled by a method of manufacturing a cadmium non-sintered negative electrode for use in an alkaline storage cell, comprising the steps of kneading a main active material comprising at least one of powdered cadmium oxide and powdered cadmium hydroxide, a reserve charging substance comprising powdered metal cadmium, an additive comprising powdered nickel hydroxide, a binder and a dispersion medium to obtain active material paste; coating a conductive substrate with the active material paste; drying the active material paste to obtain an unhydrated electrode plate; and prehydrating the unhydrated electrode plate in a solution of sodium hydroxide.

The binder may comprise at least one of the group consisting of methyl cellulose, polyvinyl alcohol and carboxymethyl cellulose.

The dispersion medium may comprise a water including at least one oxyacid salt selected from the group consisting of phosphate, silicate, arsenate and chromate.

The active material paste may further include a reinforcing agent.

The reinforcing agent may comprise at least one of the group consisting of polyamide staple, polyolefine staple and acrylic staple.

One of the reasons of the problem of the prior art, namely capacity deterioration of the cadmium negative electrode, is solved by the above construction and method.

The above deterioration is caused by inactivation of the cadmium active material, which is attributed to the following two phenomena: (a) in the course of charge-discharge cycles, cadmium as a main active material is dissolved and deposited in repetition although by a very small amount, whereby its grains get large; and (b) surfaces of the grains of the cadmium active material are covered with cadmium hydroxide which has been formed by discharging, whereby the cadmium active material remains undischarged and is not involved in charge-discharge reaction.

Since the cadmium negative electrode lowers its capacity in the course of charge-discharge cycles, the cell capacity gets determined by the negative electrode capacity. However, if nickel hydroxide is added to the cadmium active material as in the present invention, the above two phenomena can be restricted. It has been confirmed through experiments that if the added nickel hydroxide has an average grain size of 1.5 $\mu$m or more, its effect can be especially conspicuous. The reason is: nickel hydroxide grains of that size or nickel ions existing between the grains of the cadmium active material attract the cadmium, thereby to reduce the amount of the cadmium dissolved in the electrolyte, and also to restrict the grains of the cadmium active material from getting large.

It should be noted that the average grain size of more than 200 m is not desirable because nickel hydroxide formed of so large grains is hard to add uniformly to the cadmium negative electrode.

Therefore, the desirable average grain size of the nickel hydroxide is 1.5 to 200 $\mu$m.

The above objects are also fulfilled by a cadmium non-sintered negative electrode for use in an alkaline storage cell, comprising a main active material comprising at least one of powdered cadmium oxide and powdered cadmium hydroxide; a reserve charging substance comprising powdered metal cadmium; and an additive comprising powdered nickel hydroxide whose average grain size is 1.5 to 200 $\mu$m.

The above objects are also fulfilled by a method of manufacturing a cadmium non-sintered negative electrode for use in an alkaline storage cell, comprising the steps of kneading a main active material comprising at least one of powdered cadmium oxide and powdered cadmium hydroxide, a reserve charging substance comprising powdered metal cadmium, an additive comprising powdered nickel hydroxide having an average grain size of 1.5 to 20 $\mu$m, a binder and a dispersion medium to obtain an active material paste; coating a conductive substrate with the active material paste and drying the active material paste.

The powdered metal cadmium may be formed of fine grains.

The other reason of the problem of the prior art, namely leak of electrolyte caused by pressure valve operation, is solved by the above construction and method.

It has been confirmed through experiments that, when cadmium oxide is hydrated in an aqueous solution of sodium hydroxide, the reacting speed is increased by raising the temperature of the sodium hydroxide solution. For example, the reaction takes an hour by the solution of 20° C. while it takes only 10 minutes by the solution of 70° C. When magnesium oxide is used as a dendrite preventor as disclosed in Japanese Patent Publication laid-open No. 56-30259 and Japanese Patent Publication No. 62-15994, cadmium hydroxide formed of γ-type crystals which make the cell easy to charge is obtained if the solution temperature is 20° C. However, if the prehydration is conducted quickly in the solution of as high as 70° C., the obtained cadmium hydroxide is mainly formed of β-type crystals (FIG. 1). Since β-type crystals are large, the surface area of the cadmium hydroxide is decreased and hydrogen overvoltage is lowered. Especially when the cell is charged at a low temperature, hydrogen gas is easily generated.

However, it has been confirmed that if nickel hydroxide is added as a dendrite preventor as in the present invention, cadmium hydroxide formed of γ-type crystals is obtained even if the prehydration is conducted at a high temperature (FIG. 2). Since γ-type crystals are very fine, the surface area of the cadmium hydroxide is increased. Therefore, the obtained cell is easy to charge and can restrict hydrogen gas generation. Since the inner pressure of the cell is not raised, there is no operation of the pressure valve or electrolyte leak. As a result, the cycle characteristic can be kept high.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

Embodiment I

Example of the Present Invention

Cadmium oxide (average grain size: 0.8 μm) as a main active material and metal cadmium (average grain size: 1.5 μm) as a reserve charging substance were mixed in a weight ratio (%) of 90:10 to obtain a cadmium active material. The cadmium active material was mixed with 2 wt. % of nickel hydroxide (average grain size: 10 μm) whose grain shape was globe as an additive to obtain a powdered mixture. The nickel hydroxide contained approx. 0.1% of $SO_4^{2}$— as a foreign substance. All the average grain sizes are expressed in Fischer size in this specification.

Then, a solution comprising 0.5 wt. % of acrylic staple, 0.8 wt. % of methyl cellulose as a binder and 40 wt. % of water including sodium phosphate were added to the above powdered mixture powder and kneaded to obtain an active material paste. The water including sodium phosphate was added as a dispersion medium.

The active material paste was coated on a conductive substrate formed of a punched metal, dried and cut into a specified size to obtain a cadmium negative electrode for use in an SC-size cell. The cadmium negative electrode and a nickel sintered positive electrode were wound together with a separator therebetween and put in a cell can. An aqueous solution of potassium hydroxide having a specific gravity of 1.25 was injected into the cell can and the cell can was sealed, whereby to produce an SC-size sealed-type nickel-cadmium storage cell having a nominal capacity of 1.2 Ah. This cell according to the present invention will be referred to as Cell A.

Comparative Example I

Cell $V_1$ was produced in the same method as Cell A except that various-shaped nickel hydroxide was used as an additive instead of the globe nickel hydroxide.

Comparative Example II

Cell $V_2$ was produced in the same method as Cell A except that no additive was used.

Experiment I

Storage characteristics of Cells A, $V_1$ and $V_2$ were checked and are shown in Table 1 as residual capacity ratios. Each cell was fully charged and then left in a temperature of 45° C. for two weeks. Each residual capacity ratio is the percentage against the full capacity of each cell (measured in advance in the same conditions).

TABLE 1

| | Residual capacity ratio (%) |
|---|---|
| Cell A | 70 |
| Cell $V_1$ | 63 |
| Cell $V_2$ | 73 |

Table 1 shows that Cell A employing the globe nickel hydroxide as an additive was less influenced by the foreign substance and so its storage characteristic declined less compared with Cell $V_1$ employing the various-shaped nickel hydroxide.

Experiment II

Figure 1:
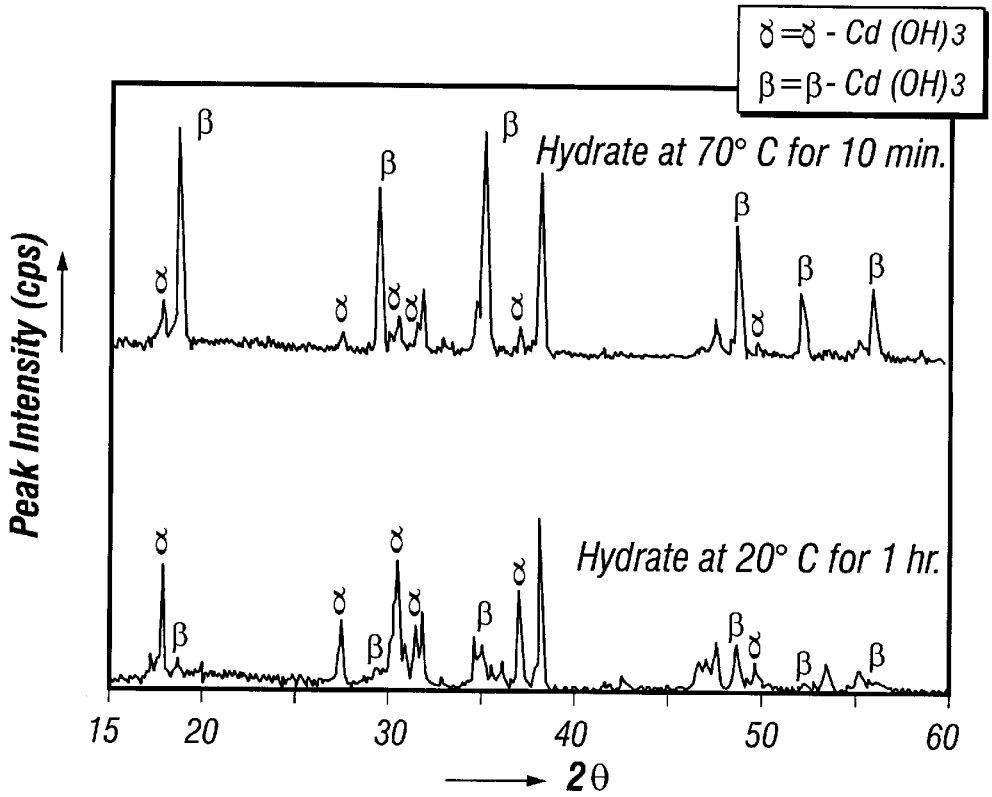
FIG. 1 is an X-ray diffraction diagram of an electrode plate produced by employing magnesium oxide as a dendrite preventor.
Figure 2:
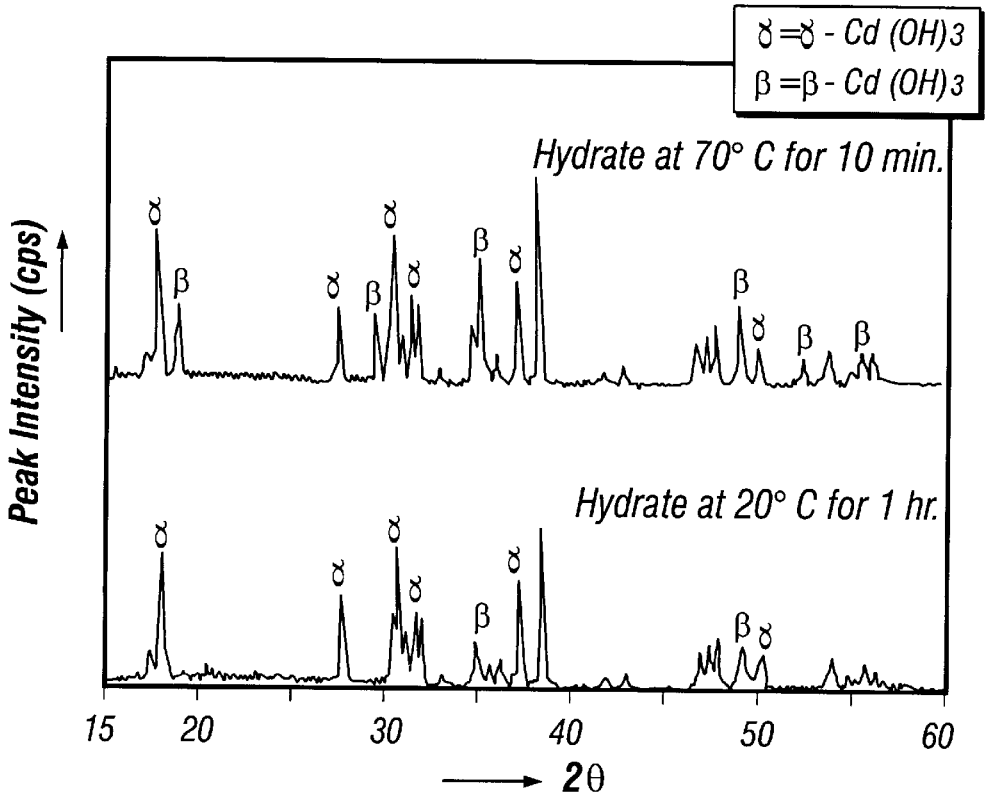
FIG. 2 is an X-ray diffraction diagram of another electrode plate produced by employing nickel hydroxide as a dendrite preventor.
Figure 3:
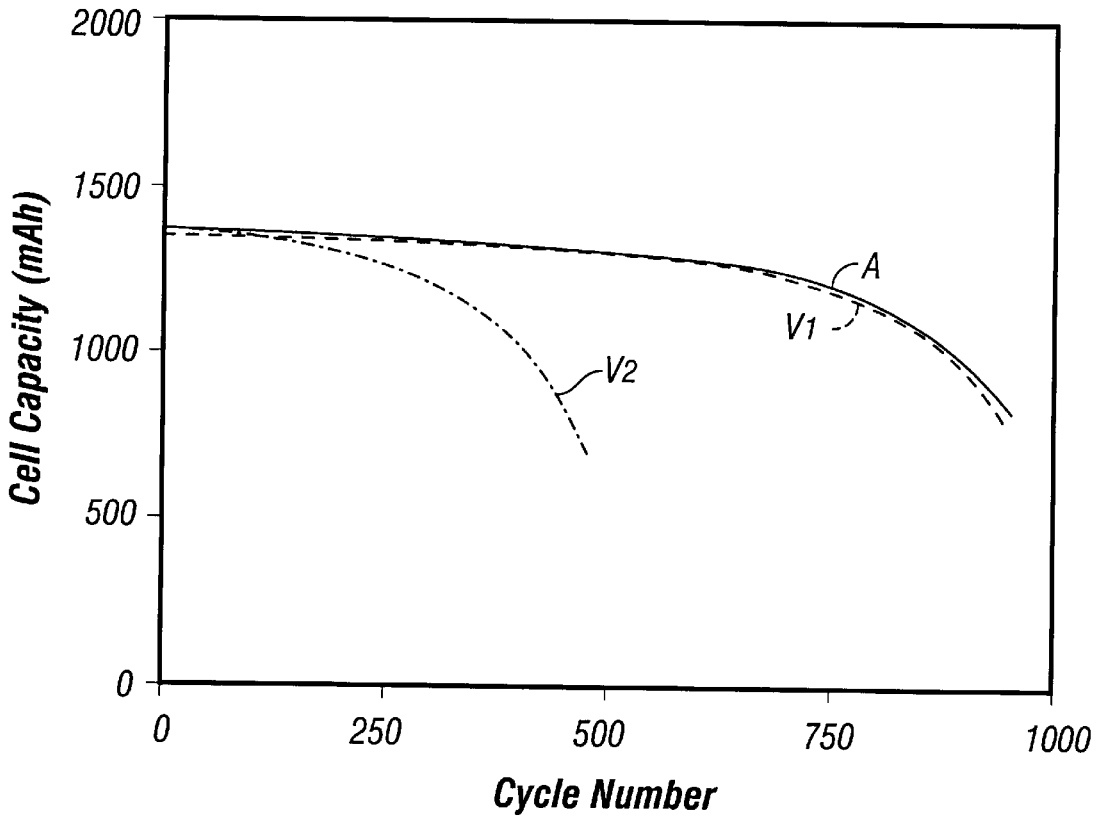
FIG. 3 is a graph showing cycle characteristics of Cell A according to this invention and Cells $V_1$ and $V_2$ as comparative examples.

Cycle characteristics of Cells A, $V_1$ and $V_2$ were checked and are shown in FIG. 3. The cells were charged at 1.5 C (1,800 mA) for 60 minutes and then discharged at 1 C until their voltages were reduced to 0.8 V.

In FIG. 3, Cell A employing the globe nickel hydroxide showed a higher cycle characteristic than Cell $V_2$ employing no nickel hydroxide did.

As apparent from Experiments I and II, Cell A according to this invention is excellent both in the storage and cycle characteristics.

The globe nickel hydroxide used in the present invention was produced by reacting an alkaline solution with a solution of acid nickel salt at an appropriate temperature, pH and the like. When the inventors mention the grain shape is globe, they means the gains look globe or substantially globe when observed through an electron microscope. The globe nickel hydroxide is clearly differentiated from the various-shaped nickel hydroxide which is usually employed in a nickel positive electrode.

Embodiment II

Examples I Through V of the present Invention

Cells $B_1$, $B_2$, $B_3$, $B_4$ and $B_5$ were produced in the same method with Cell A except that the globe nickel hydroxide wa added respectively in weight ratios (%) of 0.5, 1.0, 2.0, 3.0 and 3.5.

Comparative Examples I Through V

Cells $W_1$, $W_2$, $W_3$, $W_4$ and $W_5$ were produced in the same method with Cell $V_1$ except that the various-shaped nickel hydroxide was added respectively in weight ratios (%) of 0.5, 1.0, 2.0, 3.0, and 3.5.

Each of the globe and various-shaped nickel hydroxide used in Embodiment II had an average grain size of 3.0 μm and contained approx. 0.1% of $SO_4^{2-}$ as a foreign substance.

Experiment I

Figure 4:
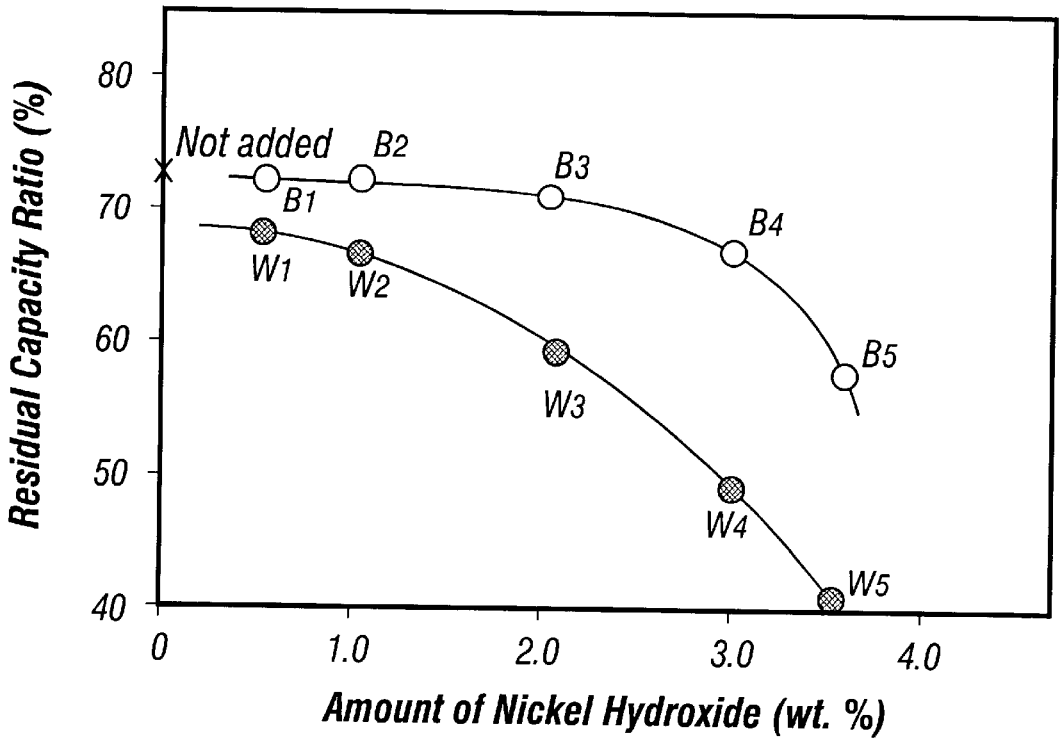
FIG. 4 is a graph showing the relationship between the amount of nickel hydroxide and residual capacity ratio of Cells $B_1$ through $B_5$ according to this invention and Cells $W_1$ through $W_5$ as comparative examples.

Storage characteristics of Cells $B_1$ through $B_5$ and Cell $W_1$ through $W_5$ were checked and are shown in FIG. 4. The cells were fully charged and then left in a temperature of 45° C. for 15 days.

In the case of Cells $W_1$ through $W_5$ employing various-shaped nickel hydroxide, the residual capacity ratio drastically decreased as the amount of nickel hydroxide increased. In the case of Cells $B_1$ through $B_5$ employing the globe nickel hydroxide, the decreased amount of residual capacity ratio was small even as the amount of nickel hydroxide increased. Especially when the amount of nickel hydroxide was 3.0 wt. % or less, the residual capacity ratio hardly decreased.

Experiment I

Figure 5:
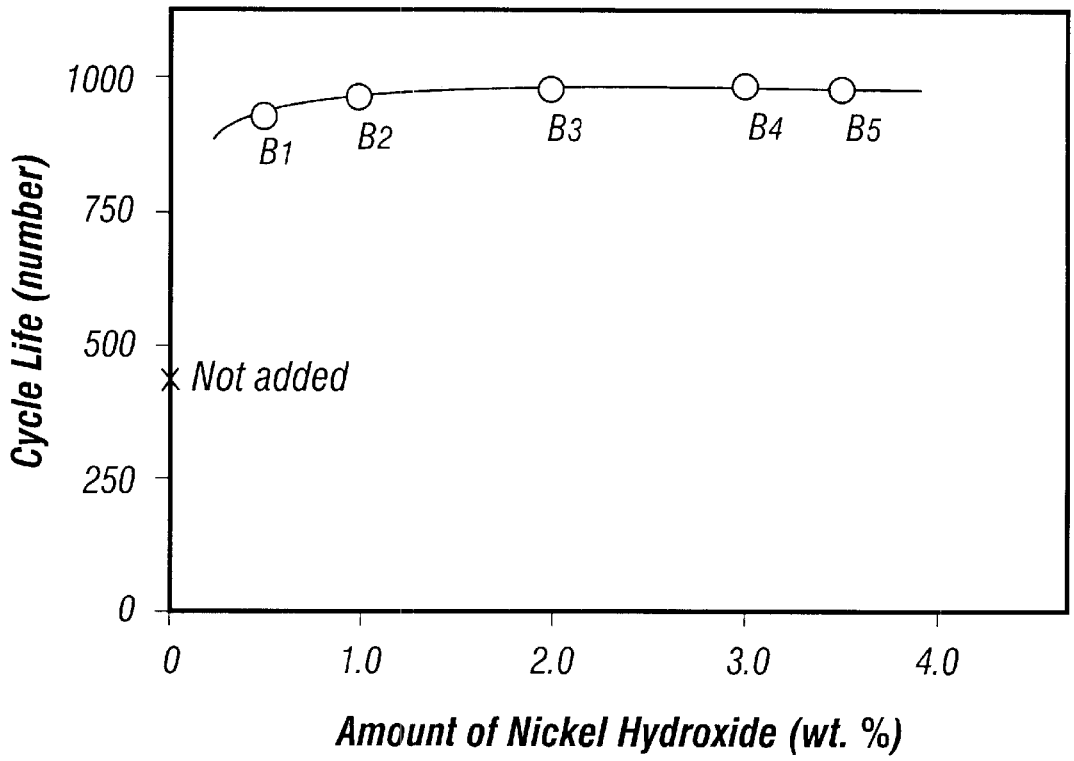
FIG. 5 is a graph showing the relationship between the amount of nickel hydroxide and the cycle life of Cells $B_1$ through $B_5$.

The relationship between the added amounts of nickel hydroxide and cycle characteristics of Cells $B_1$ through $B_5$ was checked and is shown in FIG. 5. The cells were charged at 1.5 C for an hour and then discharged at 1.0 C until their voltages were reduced to 0.8 V. The cycle life of each cell was considered to finish when the cell capacity was reduced to 60% of in its initial capacity.

FIG. 5 shows if the amount of nickel hydroxide is 0.5 wt. % or more, the effect of adding it is noticeable.

It is apparent from Experiments I and II that the desirable amount of the globe nickel hydroxide is 0.5 wt. % or more and 3.0 wt. % or less.

The metal cadmium which was used in Embodiments I and II was produced by substitute reaction of powdered metal zinc and a solution of cadmium sulfate. The metal cadmium produced in this way has high reactivity and fine grain obtained by pulverizing sponge-type metal cadmium.

Although the metal cadmium used in Embodiments I and II had an average grain size of 1.5 μm, the inventors have confirmed through experiments that an average grain size of 1.0 to 2.4 μm is most appropriate.

Embodiment III

All the grains of nickel hydroxide used in the following examples were globe-shaped.

Example I of the Present Invention

Cell $C_1$ was produced in the same method with Cell A except that 1 wt. % of nickel hydroxide (average grain size: 10 μm) was used as an additive.

Example II of the Present Invention

Cell $C_2$ was produced in the same method with Cell $C_1$ except that nickel hydroxide having an average grain size of 5 μm) was used as an additive.

Example III of the Present Invention

Cell $C_3$ was produced in the same method with Cell $C_1$ except that nickel hydroxide having an average grain size of 1.5 μm) was used as an additive.

Example IV of the Present Invention

Cell $C_4$ was produced in the same method with Cell $C_1$ except that nickel hydroxide having an average grain size of 0.3 μm) was used as an additive.

Experiment

Figure 6:
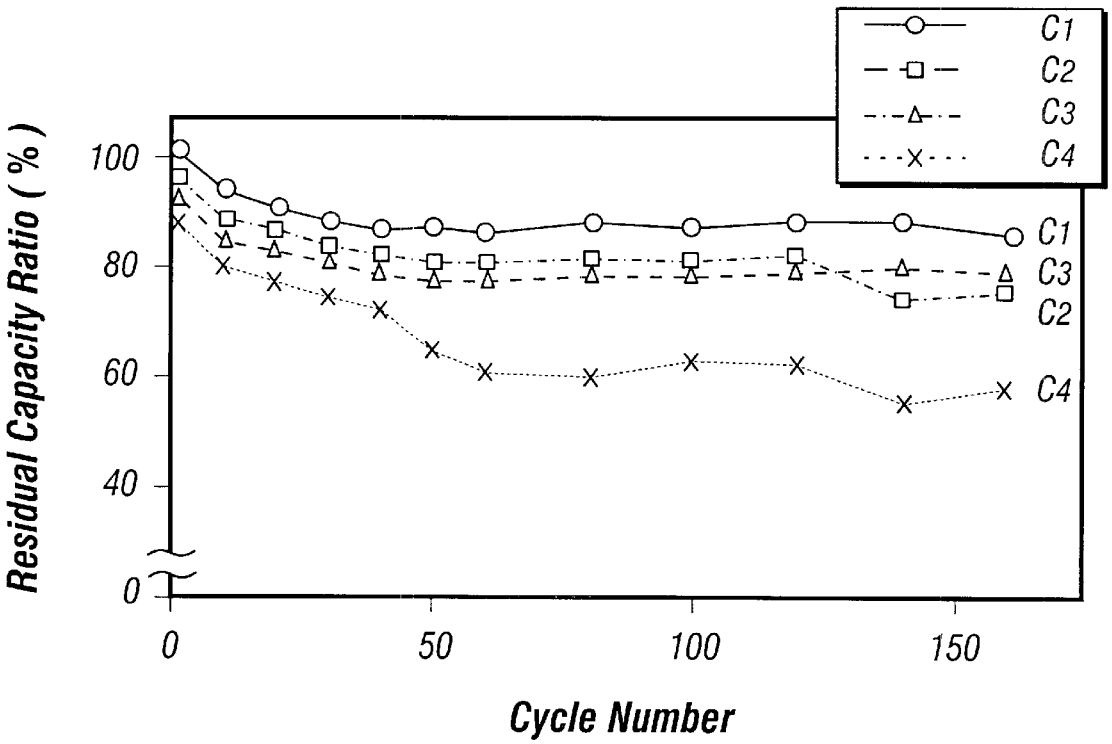
FIG. 6 is a graph showing the relationship between the cycle number and the residual capacity ratio of Cell $C_1$ through $C_4$ according to this invention.

Cycle characteristics of Cells $C_1$ through $C_4$ were checked and are shown in FIG. 6. The cells were charged at 0.1 C (120 mA) for 1.6 hours and then discharged at 4 C (4,800 mA) until their voltages were reduced to 0.8 V. This discharging condition is high-rate enough to easily cause the cadmium active material to be confined, namely to easily cause the negative electrode to deteriorate if used in a conventional cadmium paste negative electrode.

In FIG. 6, Cells $C_1$ through $C_3$ employing the nickel hydroxide with average grain sizes of 1.5 μm or more showed higher cycle characteristics than Cell $C_4$ did.

Although the nickel hydroxide as an additive was added in 1 wt. % against the cadmium active material in Embodiment III, various experiments have shown that 0.2 wt. % to 1.5 wt. % is most appropriate.

Embodiment IV

Example of the Present Invention 800 g of cadmium oxide as a main active material, 200 g of metal cadmium as an reserve charging substance, 10 g of nickel hydroxide (globe-shaped; average grain size: 10 μm) as a dendrite preventor, 6 g of methyl cellulose as a binder, 10 g of acrylic staple as a reinforcing agent, and 400 ml of water including sodium phosphate as a hydration preventor (dispersion medium) of the above cadmium oxide were kneaded to obtain an active material paste. The active material paste was coated on both surfaces of a conductive substrate and dried to obtain an unhydrated electrode plate. The unhydrated electrode plate was prehydrated in a 25%, 70° C. solution of sodium hydroxide for 10 minutes to obtain a hydrated electrode plate, where the above cadmium oxide had almost totally been changed into cadmium hydroxide. The hydrated electrode plate was rinsed and dried to produce a cadmium electrode plate. Then, the cadmium electrode plate was combined with a known nickel sintered positive electrode to produce an SC-size cell having a nominal capacity of 1,300 mAh. This cell according to this invention will be referred to as Cell D.

Comparative Example

Cell Y was produced in the same method with Cell D except that 10 g of magnesium oxide was employed as a dendrite preventor instead of nickel hydroxide.

Experiment

Cells D and Y were charged at 0.3 C (390 mA) at 0° C. for 70 hours, thereafter the total gas amount and the hydrogen gas amount in each cell were checked. The results are in Table 2.

TABLE 2

| | Total gas amount (cc) | Hydrogen gas amount (cc) |
|---|---|---|
| Cell D | 12 | 10 |
| Cell Y | 50 | 45 |

As apparent from Table 2, both of the total gas amount and the hydrogen gas amount of Cell D were much smaller than those of Cell Y.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A cadmium non-sintered negative electrode for use in an alkaline storage cell, comprising:

a main active material comprising at least one of powdered cadmium oxide and powdered cadmium hydroxide; a reserve charging substance comprising powdered metal cadmium; and an additive comprising powdered nickel hydroxide whose grain shape is substantially globe.

2. A negative electrode of claim 1, wherein the nickel hydroxide is added in a weight ratio of 0.5 wt. % to 3.0 wt. %.

3. A negative electrode of claim 1, wherein the powdered nickel hydroxide has an average grain size of 1.5 to 200 μm.

[4. A negative electrode of claim 1, wherein the powdered metal cadmium is formed of fine grains.]

5. A negative electrode of claim 1, wherein the powdered metal cadmium has an average grain size of 1.0 to 2.4 μm.

6. A cadmium non-sintered negative electrode for use in an alkaline storage cell, comprising:

a main active material comprising at least one of powdered cadmium oxide and powdered cadmium hydroxide;

a reserve charging substance comprising powdered metal cadmium; and an additive comprising powdered nickel hydroxide formed of substantially globe grains whose average grain size is 1.5 to 200 μm.

7. A negative electrode of claim 6, wherein the nickel hydroxide is added in a weight ratio of 0.5 wt. % to 3.0 wt. %.

[8. A negative electrode of claim 6, wherein the powdered metal cadmium is formed of fine grains.]

9. A negative electrode of claim 6, wherein the powdered metal cadmium has an average grain size of 1.0 to 2.4 μm.

*10. An alkaline storage cell comprising the cadmium non-sintered negative electrode of claim 1, an alkaline electrolyte and a positive nickel electrode.*

*11. An alkaline storage cell comprising the cadmium non-sintered negative electrode of claim 6, an alkaline electrolyte and a positive nickel electrode.*

*12. An alkaline storage cell comprising:*

*a cadmium non-sintered negative electrode comprising:*

*a main active material comprising at least one of powdered cadmium oxide and powdered cadmium hydroxide;*

*a reserve charging substance comprising powdered metal cadmium; and*

*an additive comprising powdered nickel hydroxide whose grain shape is substantially globe;*

*an alkaline electrolyte; and*

*a positive nickel electrode.*

*13. The alkaline storage cell of claim 12, wherein the powdered nickel hydroxide is added in a weight ratio of 0.5 wt. % to 3.0 wt. %.*

*14. The alkaline storage cell of claim 12, wherein the powdered nickel hydroxide has an average grain size of 1.5 to 200 μm.*

*15. The alkaline storage cell of claim 12, wherein the powdered metal cadmium has an average grain size of 1.0 to 2.4 μm.*

*16. An alkaline storage cell formed by combining the cadmium non-sintered negative electrode of claim 1, an alkaline electrolyte and a positive nickel electrode.*

*17. An alkaline storage cell formed by combining the cadmium non-sintered negative electrode of claim 6, an alkaline electrolyte and a positive nickel electrode.*

*18. An alkaline storage cell comprising:*

*a cadmium non-sintered negative electrode formed by combining an electrode composition comprising:*

*a main active material comprising at least one of powdered cadmium oxide and powdered cadmium hydroxide;*

*a reserve charging substance comprising powdered metal cadmium; and*

*an additive comprising powdered nickel hydroxide whose grain shape is substantially globe;*

*an alkaline electrolyte; and*

*a positive nickel electrode.*

*19. The alkaline storage cell of claim 18, wherein the powdered nickel hydroxide is added in a weight ratio of 0.5 wt. % to 3.0 wt. %.*

*20. The alkaline storage cell of claim 18, wherein the powdered nickel hydroxide has an average grain size of 1.5 to 200 μm.*

*21. The alkaline storage cell of claim 18, wherein the powdered metal cadmium has an average grain size of 1.0 to 2.4 μm.*

* * * * *